(12) United States Patent
Becker

(10) Patent No.: US 11,625,045 B2
(45) Date of Patent: Apr. 11, 2023

(54) SYSTEMS AND METHODS FOR CONTROLLING AN AUTONOMOUS VEHICLE WITH OCCLUDED SENSOR ZONES

(71) Applicant: UATC, LLC, San Francisco, CA (US)

(72) Inventor: Brian C. Becker, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 646 days.

(21) Appl. No.: 15/985,820

(22) Filed: May 22, 2018

(65) Prior Publication Data

US 2019/0064840 A1 Feb. 28, 2019

Related U.S. Application Data

(60) Provisional application No. 62/552,515, filed on Aug. 31, 2017.

(51) Int. Cl.
| | | |
|---|---|---|
| *G05D 1/02* | (2020.01) | |
| *B60W 30/18* | (2012.01) | |
| *G05D 1/00* | (2006.01) | |
| *G01S 13/931* | (2020.01) | |

(52) U.S. Cl.
CPC ..... *G05D 1/0248* (2013.01); *B60W 30/18163* (2013.01); *G05D 1/0088* (2013.01); *G05D 1/024* (2013.01); *G05D 1/0212* (2013.01); *B60W 2520/06* (2013.01); *B60W 2555/00* (2020.02); *G01S 2013/93273* (2020.01); *G05D 2201/0213* (2013.01)

(58) Field of Classification Search
None
See application file for complete search history.

(56) References Cited

U.S. PATENT DOCUMENTS

| | | | |
|---|---|---|---|
| 7,463,182 B1 * | 12/2008 | Morinaga | G01S 13/536 342/28 |
| 10,491,885 B1 * | 11/2019 | Hicks | G01S 17/86 |
| 10,642,275 B2 * | 5/2020 | Silva | G08G 1/166 |
| 2005/0010351 A1 * | 1/2005 | Wagner | B60T 7/22 701/96 |
| 2005/0228588 A1 * | 10/2005 | Braeuchle | B60W 30/12 701/301 |
| 2006/0284760 A1 * | 12/2006 | Natsume | G08G 1/167 342/72 |
| 2013/0054187 A1 * | 2/2013 | Pochiraju | G01S 17/89 702/150 |
| 2014/0214255 A1 * | 7/2014 | Dolgov | G05D 1/0274 701/23 |

(Continued)

*Primary Examiner* — Peter D Nolan
*Assistant Examiner* — Michael F Whalen
(74) *Attorney, Agent, or Firm* — Dority & Manning, P.A.

(57) ABSTRACT

Systems and methods for controlling an autonomous vehicle are provided. In one example embodiment, a computer-implemented method includes obtaining sensor data indicative of a surrounding environment of the autonomous vehicle, the surrounding environment including one or more occluded sensor zones. The method includes determining that a first occluded sensor zone of the occluded sensor zone(s) is occupied based at least in part on the sensor data. The method includes, in response to determining that the first occluded sensor zone is occupied, controlling the autonomous vehicle to travel clear of the first occluded sensor zone.

17 Claims, 8 Drawing Sheets

(56) References Cited

U.S. PATENT DOCUMENTS

| | | | | |
|---|---|---|---|---|
| 2016/0327953 | A1* | 11/2016 | Nilsson | B60W 30/18145 |
| 2017/0101092 | A1* | 4/2017 | Nguyen Van | B60W 30/095 |
| 2018/0089538 | A1* | 3/2018 | Graham | G06T 7/70 |
| 2018/0222050 | A1* | 8/2018 | Vu | B25J 9/1694 |
| 2018/0286248 | A1* | 10/2018 | Choi | G05D 1/0214 |
| 2018/0292822 | A1* | 10/2018 | Ichikawa | B60W 60/0011 |
| 2018/0326906 | A1* | 11/2018 | Savaresi | B62J 27/00 |
| 2018/0354510 | A1* | 12/2018 | Miyata | B60W 50/14 |
| 2018/0356505 | A1* | 12/2018 | Miyata | B60W 40/114 |
| 2019/0226854 | A1* | 7/2019 | Geissler | G06K 9/00664 |
| 2019/0378282 | A1* | 12/2019 | Rogan | B60D 1/06 |
| 2019/0384302 | A1* | 12/2019 | Silva | G05D 1/0088 |
| 2019/0384309 | A1* | 12/2019 | Silva | G01S 7/4861 |
| 2020/0064483 | A1* | 2/2020 | Li | G01S 7/4026 |
| 2020/0079364 | A1* | 3/2020 | Min | G06K 9/00805 |
| 2020/0114921 | A1* | 4/2020 | Simmons | B60W 30/18163 |
| 2020/0219264 | A1* | 7/2020 | Brunner | G01S 17/931 |
| 2020/0278681 | A1* | 9/2020 | Gier | G05D 1/0257 |
| 2020/0310425 | A1* | 10/2020 | Ghose | B60W 30/09 |

* cited by examiner

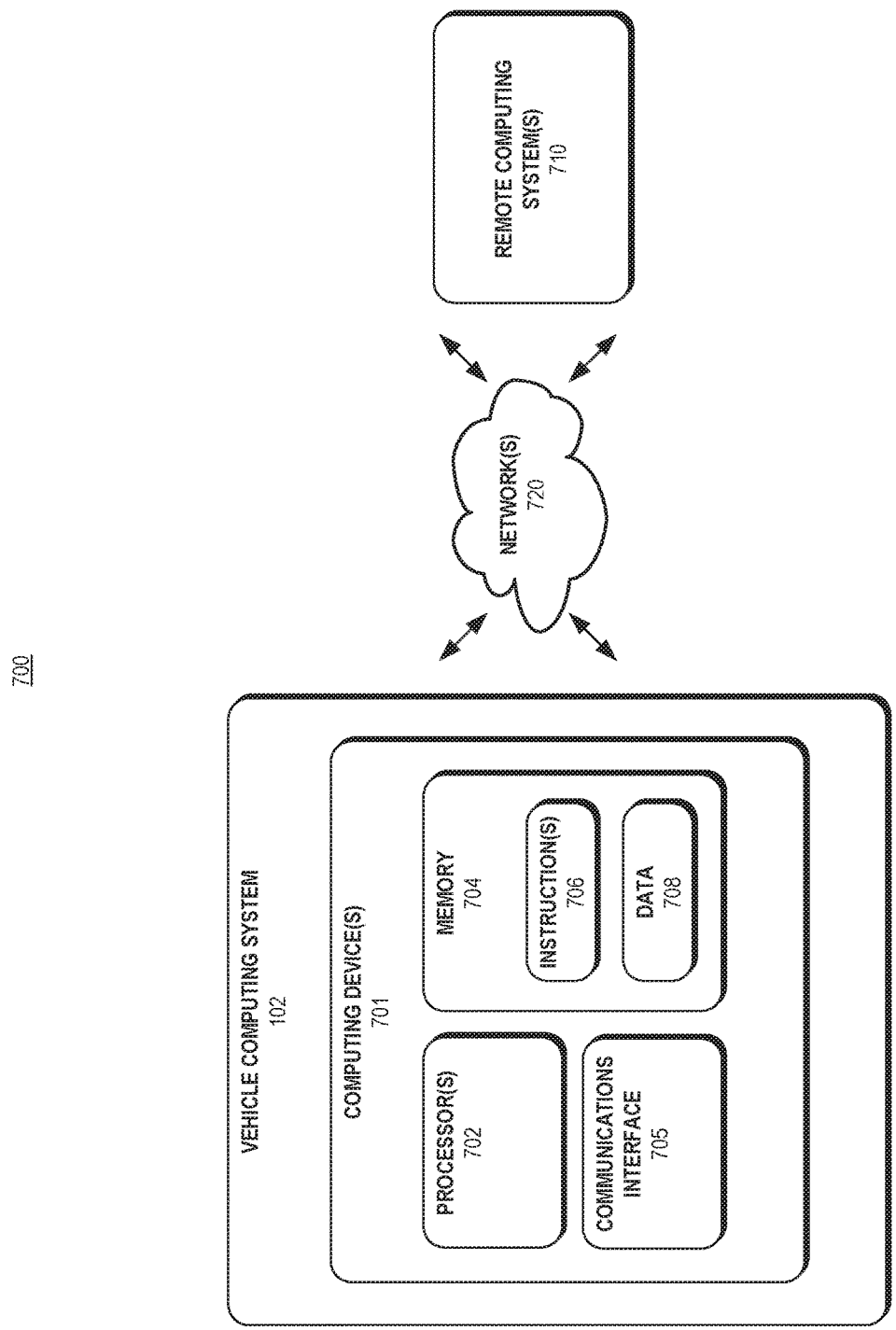

SYSTEMS AND METHODS FOR CONTROLLING AN AUTONOMOUS VEHICLE WITH OCCLUDED SENSOR ZONES

PRIORITY CLAIM

The present application claims the benefit of priority of U.S. Provisional Patent Application No. 62/552,515 filed Aug. 31, 2017, entitled "Systems and Methods for Controlling an Autonomous Vehicle Including Occluded Sensor Zones." The above-referenced patent application is incorporated herein by reference.

FIELD

The present application relates generally to autonomous vehicles and, more particularly, the systems and methods for controlling an autonomous vehicle that has one or more occluded sensor zones.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion plan through such surrounding environment.

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle. The method includes obtaining, by a computing system comprising one or more computing devices, sensor data indicative of a surrounding environment of the autonomous vehicle, the surrounding environment including one or more occluded sensor zones. The method includes determining, by the computing system, that a first occluded sensor zone of the one or more occluded sensor zones is occupied based at least in part on the sensor data. The method includes, in response to determining that the first occluded sensor zone is occupied, controlling, by the computing system, the autonomous vehicle to travel clear of the first occluded sensor zone.

Another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include obtaining sensor data indicative of a surrounding environment of the autonomous vehicle, the surrounding environment including one or more occluded sensor zones. The operations include determining that a first occluded sensor zone of the one or more occluded sensor zones is occupied based at least in part on the sensor data. The operations include, in response to determining that the first occluded sensor zone is occupied, controlling the autonomous vehicle to travel clear of the first occluded sensor zone.

Yet another example aspect of the present disclosure is directed to an autonomous vehicle. The autonomous vehicle includes one or more vehicle input devices. The autonomous vehicle includes one or more processors and one or more tangible, non-transitory, computer readable media that collectively store instructions that when executed by the one or more processors cause the autonomous vehicle to perform operations. The operations include obtaining sensor data indicative of a surrounding environment of the autonomous vehicle, the surrounding environment including one or more occluded sensor zones. The operations include determining that a first occluded sensor zone of the one or more occluded sensor zones is occupied based at least in part on the sensor data. The operations include, in response to determining that the first occluded sensor zone is occupied, controlling the autonomous vehicle to travel clear of the first occluded sensor zone.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 7 depicts example system components according to example embodiments of the present disclosure.

DETAILED DESCRIPTION

Figure 1:
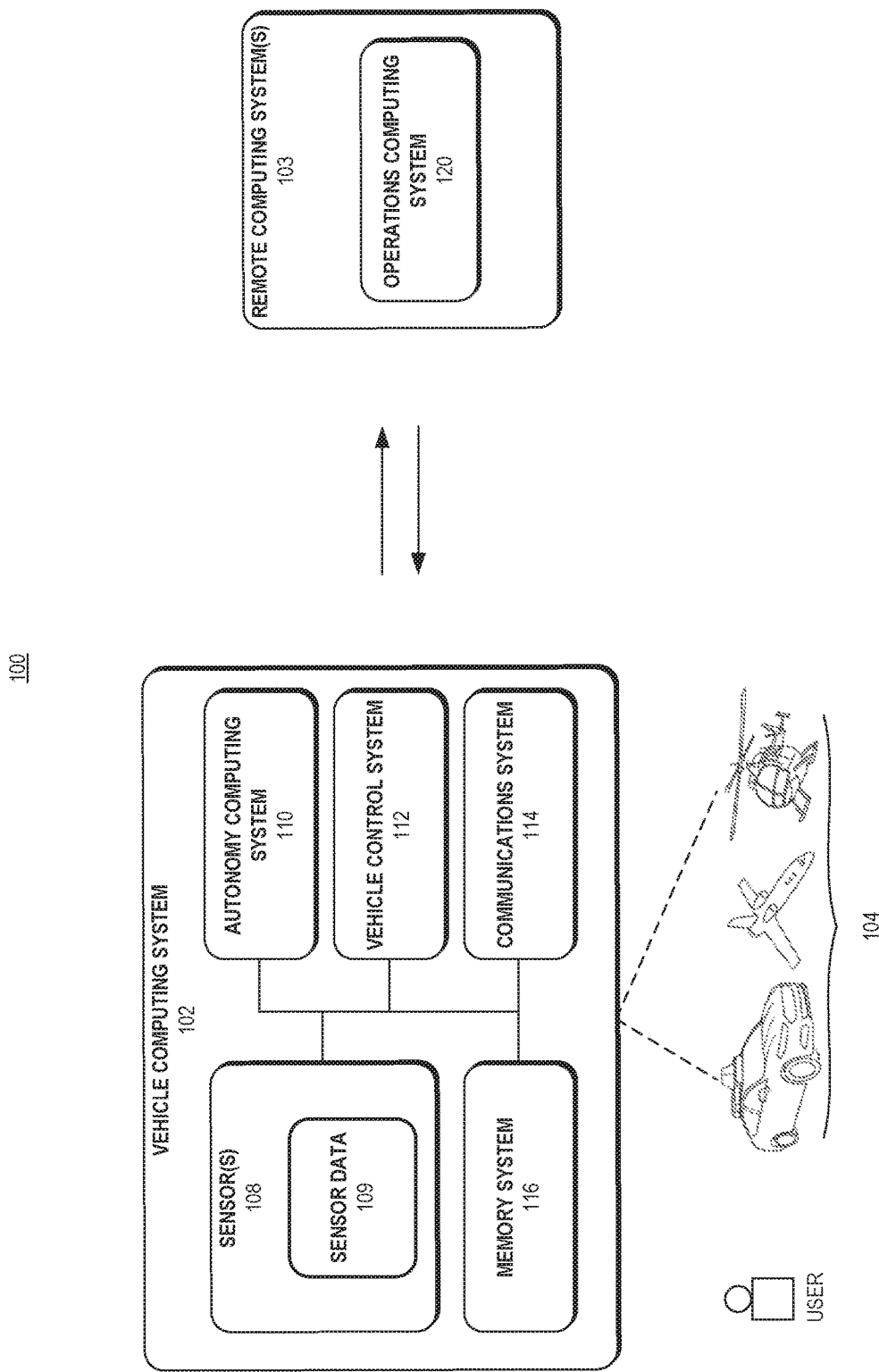
FIG. 1 depicts an example system overview, according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to navigating an autonomous vehicle that includes one or more occluded sensor zone(s). The autonomous vehicle can be configured to autonomously navigate through a surrounding environment by executing one or more planned trajectories in a motion plan that cause the autonomous vehicle to travel along a vehicle route. The autonomous vehicle can obtain sensor data indicative of the surrounding environment and adjust the motion plan accordingly, to safely navigate through the surrounding environment. However, in some situations, one or more region(s) in the surrounding environment can become occluded to the sensors, and these regions can be referred to as "occluded sensor zones." For example, an object can pass between a region in a surrounding environment and a sensor of an autonomous vehicle, and cause the region in the surrounding environment to become momentarily occluded to the sensor. For example, an object in a surrounding environment can become fixed with respect to a sensor of an autonomous vehicle, such that a region of the sensor's field of view becomes occluded to the surrounding environment. As another example, a sensor of an autonomous vehicle can malfunction or sustain damage such that a region of the sensor's field of view becomes occluded to the surrounding environment.

In particular, an occluded sensor zone can correspond to one or more region(s) of the surrounding environment from which some or all sensor signal(s) are obstructed or interfered with prior to reaching a sensor of the autonomous vehicle. When some or all sensor signal(s) from a region of the surrounding environment are obstructed or interfered with prior to reaching a sensor of the autonomous vehicle, then the autonomous vehicle may not obtain sufficient sensor data for tracking and predicting motions of one or more object(s) in that region of the surrounding environment. For example, an object in front of an autonomous vehicle can obstruct sensor signal(s) from a region in front of the object. As another example, one or more dimension(s) or physical portions of an autonomous vehicle itself can obstruct sensor signal(s) arriving from a region of the surrounding environment from reaching one or more sensor(s) of the autonomous vehicle. As yet another example, an object in a region of a surrounding environment can absorb, scatter, or redirect sensor signal(s), rendering the object nearly or completely invisible to a sensor. As another example, an autonomous vehicle can be equipped with one or more radar sensor(s), but directly to the right and left of the autonomous vehicle, sensor data obtained by the radar sensors can be insufficient for tracking and predicting motions of one or more object(s) because the data would largely be tangential velocity.

The present disclosure can enable an autonomous vehicle to determine whether an occluded sensor zone includes an object. The autonomous vehicle can determine that an occluded sensor zone is occupied if it includes an object, or that the occluded sensor zone is unoccupied if it does not include an object, and adjust a motion plan accordingly. In particular, the autonomous vehicle can be controlled to travel clear of an occluded sensor zone that is occupied. In such fashion, the safety of the autonomous vehicle can be improved.

More particularly, an autonomous vehicle can include various systems and devices configured to control the operation of the autonomous vehicle. For example, an autonomous vehicle can include an onboard vehicle computing system for operating the vehicle (e.g., located on or within the autonomous vehicle).

The vehicle computing system can receive sensor data from sensor(s) onboard the autonomous vehicle (e.g., cameras, LIDAR, RADAR), attempt to comprehend the autonomous vehicle's surrounding environment by performing various processing techniques on the sensor data, and generate an appropriate motion plan through the autonomous vehicle's surrounding environment.

For example, an autonomous vehicle can obtain sensor data representing a position and velocity of other vehicles in the surrounding environment and the autonomous vehicle can adjust its motion plan to avoid a collision with the other vehicles. The autonomous vehicle can obtain the sensor data from one or more sensor(s) located on the autonomous vehicle that can receive one or more sensor signal(s) from the surrounding environment. For example, an autonomous vehicle can include an optical sensor that can receive light from the surrounding environment. As another example, an autonomous vehicle can include a RADAR sensor that can receive radio waves from the surrounding environment. The sensor signal(s) can be generated by an object in the surrounding environment and/or reflected off an object in the surrounding environment. The autonomous vehicle can use the sensor signal(s) received by a sensor to identify and track one or more object(s) (e.g., vehicles, signs, people, etc.) in the surrounding environment in order to adjust the motion plan as it travels along the vehicle route.

Moreover, the autonomous vehicle can be configured to communicate with one or more computing device(s) that are remote from the autonomous vehicle. For example, the autonomous vehicle can communicate with an operations computing system that can monitor, communicate with, manage, etc. the autonomous vehicle.

According to an aspect of the present disclosure, in some implementations, the autonomous vehicle can obtain data indicative of one or more predetermined occluded sensor zone(s). For example, an occluded sensor zone corresponding to an autonomous vehicle can be identified through testing, and can be stored as a predetermined occluded sensor zone. The autonomous vehicle can then obtain data indicative of the predetermined occluded sensor zone.

According to an aspect of the present disclosure, in some implementations, the autonomous vehicle can analyze sensor data indicative of the surrounding environment of the autonomous vehicle to identify one or more occluded sensor zone(s) in the surrounding environment. In particular, an autonomous vehicle can analyze raw sensor data (e.g., one or more sensor signal(s) received by a sensor) obtained from each region in the surrounding environment to determine if there is sufficient information from each region. For example, if an autonomous vehicle receives a minimum threshold of raw sensor data from a region in a surrounding environment, then the autonomous vehicle can determine that the region is not an occluded sensor zone. As another example, if an autonomous vehicle receives raw sensor data below a minimum threshold from a region in a surrounding environment, then the autonomous vehicle can determine that the region is an occluded sensor zone. The minimum threshold can be a constant minimum amount of raw sensor data, or can be variable based on whether the autonomous vehicle can identify or track an object based on an amount of raw sensor data received. For example, an autonomous vehicle can determine that a region is an occluded sensor zone if the autonomous vehicle obtains less than the minimum threshold of raw sensor data. As another example, an autonomous vehicle can attempt to comprehend a region of the surrounding environment based on raw sensor data from the region, and determine that the region is an occluded sensor zone if the autonomous vehicle cannot comprehend the region based on the received raw sensor data from the region. The autonomous vehicle can store data indicative of each occluded sensor zone identified in the surrounding environment.

In some implementations, the autonomous vehicle can process the raw sensor data to filter out sensor signals from a ground region of the surrounding environment, before analyzing the raw sensor data to identify one or more occluded sensor zone(s). In this way, the autonomous vehicle can avoid a false positive determination that a region is not an occluded sensor zone based on sensor signals received from the ground region in the surrounding environment.

According to an aspect of the present disclosure, the autonomous vehicle can determine if an occluded sensor zone is occupied. For example, if an autonomous vehicle receives at least one sensor signal from an occluded sensor zone, then the autonomous vehicle can determine that the occluded sensor zone is occupied. As another example, alternatively or additionally to the preceding example, if an autonomous vehicle tracks an object in the surrounding environment that enters an occluded sensor zone, then the autonomous vehicle can determine that the occluded sensor zone is occupied. In this case, if the autonomous vehicle subsequently tracks the object as it leaves the occluded sensor zone, then the autonomous vehicle can determine that the occluded sensor zone is unoccupied. Alternatively, if the autonomous vehicle cannot track the object after the object enters the occluded sensor zone, and the autonomous vehicle does not detect any sensor signals from the occluded sensor zone, then the autonomous vehicle can determine that the occluded sensor zone is occupied for a predetermined amount of time after which the autonomous vehicle can determine that the occluded sensor zone is unoccupied. As yet another example, if an autonomous vehicle tracks an object leaving an occluded sensor zone, and the autonomous vehicle does not detect any sensor signals from the occluded sensor zone, then the autonomous vehicle can determine that the occluded sensor zone is unoccupied or will be unoccupied after a predetermined amount of time. As yet another example, if an autonomous vehicle identifies an object in the surrounding environment, where at least part of the object is located in an occluded sensor zone, then the autonomous vehicle can determine that the occluded sensor zone is occupied.

The autonomous vehicle can store data indicative of an occupancy state (e.g., occupied or unoccupied) for each identified occluded sensor zone. As the autonomous vehicle travels along the vehicle route, and as the autonomous vehicle continues to receive raw sensor data, the autonomous vehicle can update the occupancy state of each occluded sensor zone.

According to an aspect of the present disclosure, the autonomous vehicle can determine a trajectory of the autonomous vehicle based on the motion plan. The trajectory can include a current location and a future location of the autonomous vehicle. The autonomous vehicle can execute the trajectory to cause the autonomous vehicle to travel from the current location to the future location. Before executing the trajectory, the autonomous vehicle can determine if the trajectory intersects an occluded sensor zone in the surrounding environment. For example, if an autonomous vehicle identifies an occluded sensor zone in a surrounding environment to the immediate left of the autonomous vehicle, and a trajectory requires the autonomous vehicle to switch into its left lane, then the autonomous vehicle can determine that the trajectory intersects the occluded sensor zone. As another example, if an autonomous vehicle identifies an occluded sensor zone in a surrounding environment to the immediate right of the autonomous vehicle, and a trajectory requires the autonomous vehicle to make a right turn, then the autonomous vehicle can determine that the trajectory intersects the occluded sensor zone. If the autonomous vehicle determines that the trajectory intersects an occluded sensor zone, then the autonomous vehicle can check an occupancy state corresponding to the occluded sensor zone. If the occluded sensor zone is occupied, then the autonomous vehicle can adjust the motion plan to avoid executing the trajectory. For example, an autonomous vehicle can adjust a motion plan to follow a different vehicle route. As another example, an autonomous vehicle can delay executing a trajectory until an intersecting occluded sensor zone is unoccupied.

The systems and methods described herein provide a number of technical effects and benefits. Systems and methods for controlling the autonomous vehicle with occluded sensor zones can have a technical effect of improving autonomous navigation and safety. By enabling an autonomous vehicle to identify one or more region(s) in a surrounding environment with reduced visibility (e.g. occluded sensor zones), and determining an occupancy state of the regions, the autonomous vehicle can adjust a motion plan so that the autonomous vehicle can avoid a potential collision with one or more object(s) in the one or more region(s). This can allow an autonomous vehicle to safely perform autonomous navigation in more varied circumstances, improve a user experience, and increase a user's confidence in the autonomous vehicle.

Additionally, by enabling an autonomous vehicle to determine an occupancy state of an occluded sensor zone by using raw sensor data, the autonomous vehicle can identify and travel clear of an occupied occluded sensor zone without performing processing techniques on the data collected by the sensors. For example, an autonomous vehicle can determine that an object is occupying an occluded sensor zone without performing a perception technique on sensor data to classify the object, and/or a prediction technique to predict a motion path of the object. This can allow an autonomous vehicle to quickly identify when an occluded sensor zone is occupied, and respond accordingly.

The systems and methods of the present disclosure also provide an improvement to vehicle computing technology, such as autonomous vehicle computing technology. For instance, the systems and methods herein enable the autonomous vehicle technology to identify one or more occluded sensor zone(s) in a surrounding environment of the autonomous vehicle, and adjust a motion of the autonomous vehicle accordingly. For example, the systems and methods can allow one or more computing system(s) on-board an autonomous vehicle (and/or off-board a vehicle) to determine an occupancy state of each identified occluded sensor zone, and prevent the autonomous vehicle from travelling, in whole or in part, through an occupied occluded sensor zone. This can allows the autonomous vehicle to more effectively and safely perform autonomous navigation.

Example Embodiments

With reference now to the FIGS., example embodiments of the present disclosure will be discussed in further detail.

FIG. 1 depicts an example system 100 according to example embodiments of the present disclosure. The system 100 can include a vehicle computing system 102 associated with a vehicle 104. In some implementations, the system 100 can include one or more remote computing system(s) 103 that are remote from the vehicle 104. The remote computing system(s) 103 can include an operations computing system 120. The remote computing system(s) 103 can be separate from one another or share computing device(s). The operations computing system 120 can remotely manage the vehicle 104.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processor(s), etc.) to perform operations and functions, such as those described herein.

As shown in FIG. 1, the vehicle 104 can include one or more sensor(s) 108, an autonomy computing system 110, a vehicle control system 112, a communications system 114, and a memory system 116. One or more of these system(s) can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more object(s) that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more camera(s) (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 104. The sensor data 109 can be indicative of locations associated with the object(s) within the surrounding environment of the vehicle 104 at one or more times. The sensor(s) 108 can provide the sensor data 109 to the autonomy computing system 110.

Figure 2:
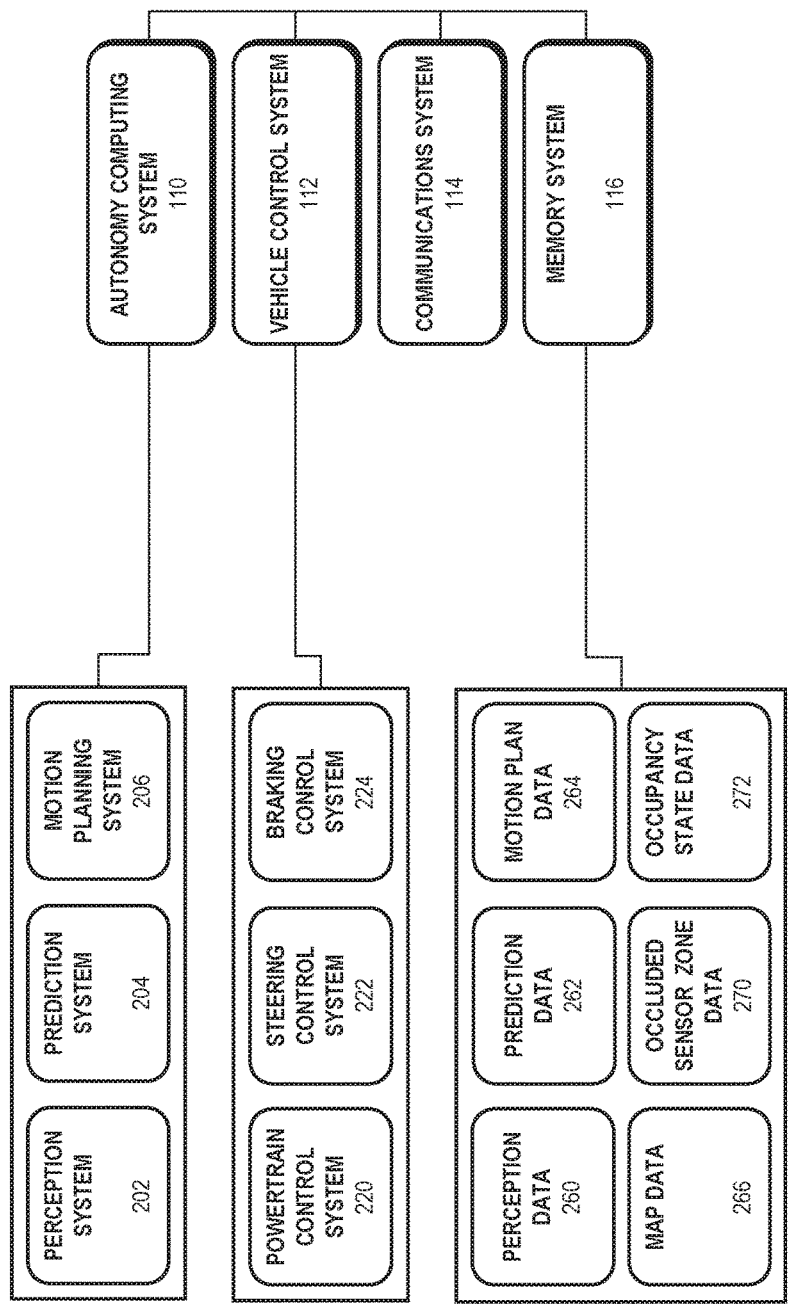
FIG. 2 depicts an example vehicle computing system for controlling an autonomous vehicle, according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the vehicle control system 112 to operate the vehicle 104 according to the motion plan.

The autonomy computing system 110 can identify one or more object(s) that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future location(s) of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle action(s), a planned trajectory, and/or other operating parameter(s) to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signal(s) to the responsible vehicle control sub-system (e.g., powertrain control system 220, steering control system 222, and braking control system 224) to execute the instructions and implement the motion plan.

The communications system 114 can allow the vehicle computing system 102 (and its computing system(s)) to communicate with other computing systems (e.g., remote computing system(s) 103). The vehicle computing system 102 can use the communications system 114 to communicate with the operations computing system 120 over one or more network(s) (e.g., via one or more wireless signal connection(s)). In some implementations, the communications system 114 can allow communication among one or more of the system(s) on-board the vehicle 104. The communications system 114 can include any suitable sub-systems for interfacing with one or more network(s). For example, the communications system 114 can include transmitters, receivers, ports, controllers, antennas, and/or other suitable sub-systems that can help facilitate communication.

The memory system 116 of the vehicle 104 can include one or more memory device(s) located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store perception data 260, prediction data 262, motion plan data 264, map data 266, occluded sensor zone data 270, and occupancy state data 272.

The map data 266 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary marking(s) associated therewith); and/or any other data that assists the vehicle computing system 102 in comprehending and perceiving its surrounding environment and its relationship thereto.

The occluded sensor zone data 270 can include data indicative of one or more predetermined occluded sensor zone(s), and/or one or more occluded sensor zone(s). For example, an occluded sensor zone corresponding to the vehicle 104 can be identified through testing, and can be stored as a predetermined occluded sensor zone. The vehicle 104 can store data indicative of the predetermined occluded sensor zone in the occluded sensor zone data 270. As another example, the vehicle 104 can analyze sensor data indicative of a surrounding environment of the vehicle 104 to identify one or more occluded sensor zone(s) in the surrounding environment. The vehicle 104 can store data indicative of each identified occluded sensor zone in the occluded sensor zone data 270.

The occupancy state data 272 can include data indicative of an occupancy state (e.g., occupied or unoccupied) for each identified occluded sensor zone in the occluded sensor zone data 270. As the vehicle 104 travels along a vehicle route, and as the vehicle 104 continues to receive raw sensor data about a surrounding environment along the vehicle route, the vehicle 104 can update the occupancy state data 272 corresponding to of each occluded sensor zone.

Figure 3A:
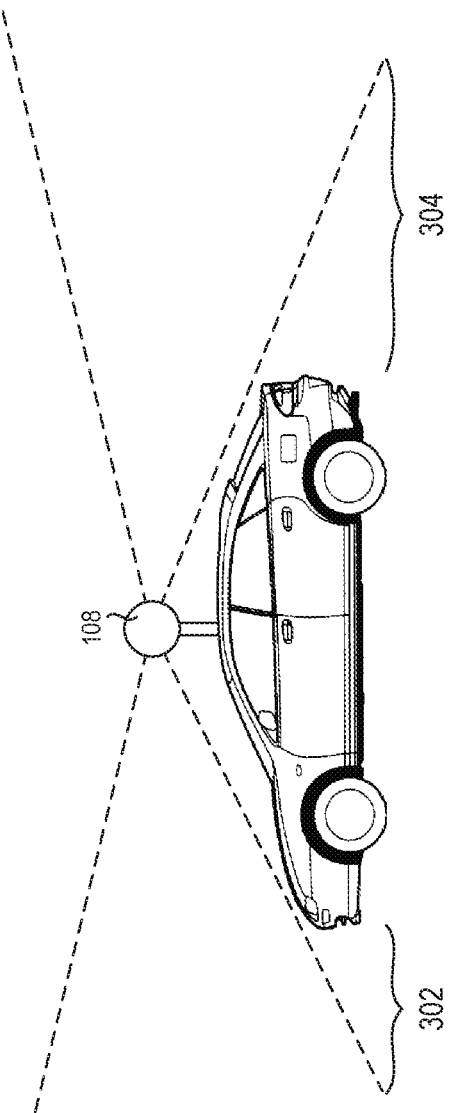
FIGS. 3A-3D depict an example autonomous vehicle, according to example embodiments of the present disclosure.
Figure 3B:
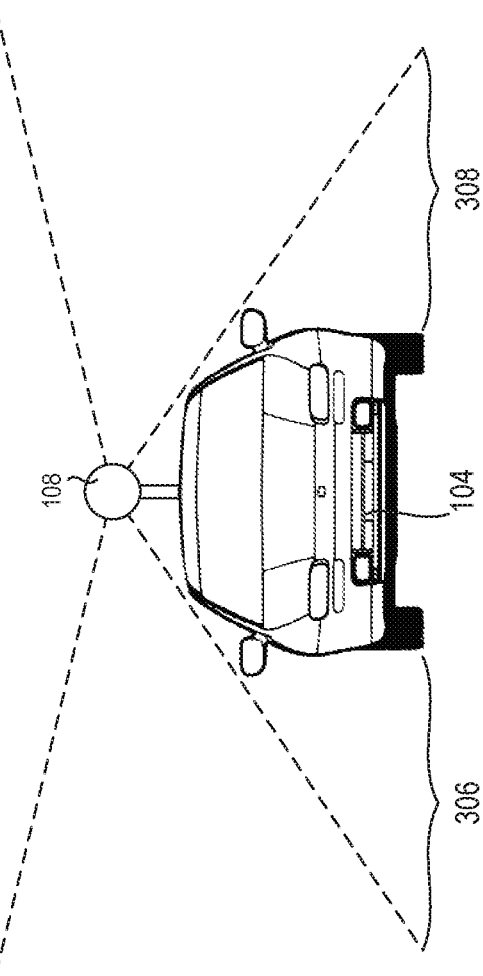
Figure 3C:
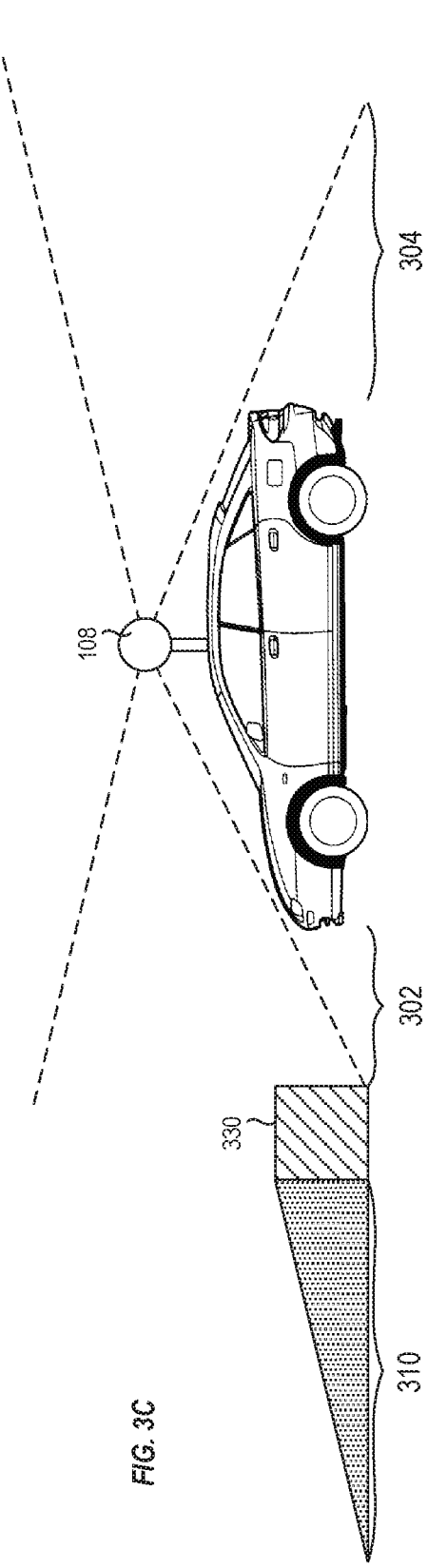
Figure 3D:
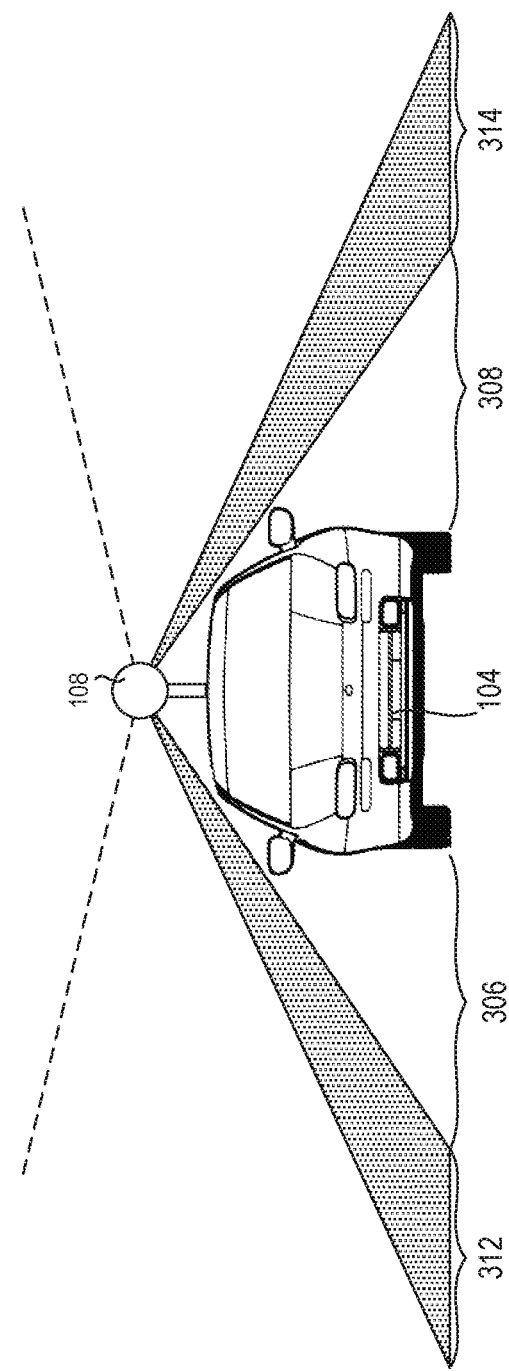

As shown in FIGS. 3A-3D, the vehicle 104 can include sensor(s) 108, and occluded sensor zones 302, 304, 306, 308, 310, 312, and 314. The occluded sensor zones 302, 304, 306, 308, 310, 312, and 314 can correspond to regions of the surrounding environment from which some or all sensor signal(s) are obstructed or interfered with prior to reaching a sensor 108 of the vehicle 104. In FIG. 3A, for example, one or more sensor signal(s) from the occluded sensor zone 302 are obstructed by a front physical portion of the vehicle 104, and one or more sensor signal(s) from the occluded sensor zone 304 are obstructed by a rear physical portion of the vehicle 104. In FIG. 3B, for example, one or more sensor signal(s) from the occluded sensor zone 306 are obstructed by a right side physical portion of the vehicle 104, and one or more sensor signal(s) from the occluded sensor zone 308 are obstructed by a left side physical portion of the vehicle 104. In FIG. 3C, for example, one or more sensor signal(s) from the occluded sensor zone 310 are obstructed by the object 330 in front of the vehicle 104. In FIG. 3D, for example, one or more sensor signal(s) from the occluded sensor zones 312 and 314 are scattered because of a high angle of incidence of the sensor signal(s) with respect to one or more object(s) in the occluded sensor zones 312 and 314.

Figure 4A:
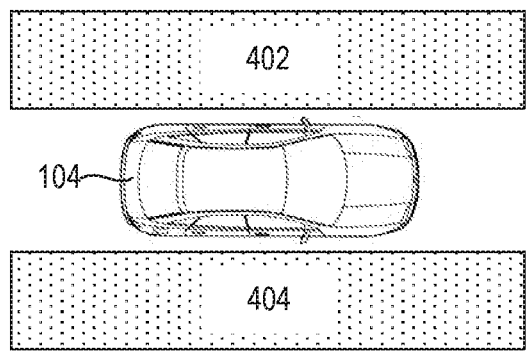
FIGS. 4A-4D depict an example autonomous vehicle, according to example embodiments of the present disclosure.
Figure 4B:
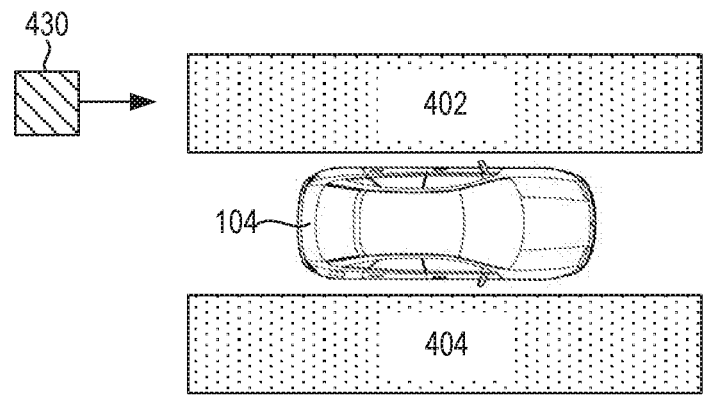
Figure 4C:
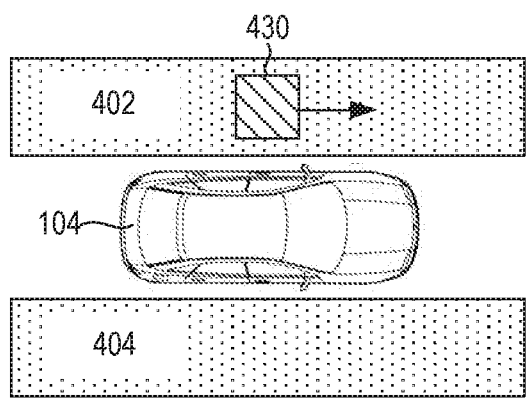
Figure 4D:
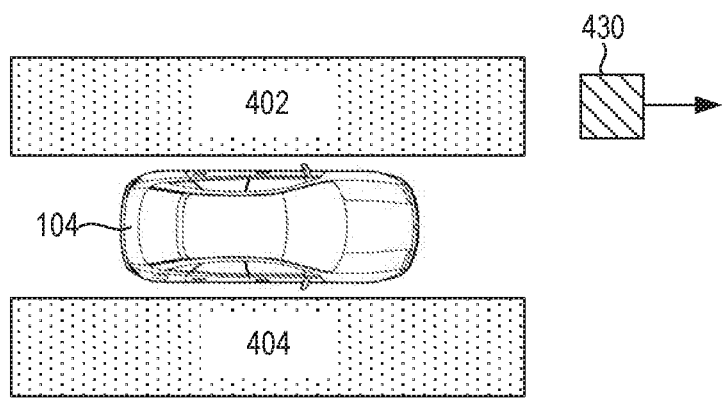

As shown in FIG. 4A, the vehicle 104 can include occluded senor zones 402 and 404. In FIG. 4B, an object 430 approaches the vehicle 104. The vehicle computing system 102 can obtain sensor data 109 indicative of the object 430, identify the object 430, and track the object 430 as it approaches the vehicle 104. In FIG. 4C, the object 430 enters the occluded sensor zone 402. The vehicle computing system 102 can obtain sensor data 109 indicative of the object 430 entering the occluded sensor zone 402. In some implementations, the vehicle 104 can attempt to track the object 430 in the occluded sensor zone 402. In FIG. 4D, the object 430 exits the occluded sensor zone 402. The vehicle computing system 102 can obtain sensor data 109 indicative of the object 430 exiting the occluded sensor zone 402.

According to an aspect of the present disclosure, when the vehicle computing system 102 obtains sensor data 109 indicative of the object 430 entering the occluded sensor zone 402, the vehicle computing system 102 can determine that the occluded sensor zone 402 is occupied.

According to an another aspect of the present disclosure, when the vehicle computing system 102 obtains sensor data 109 indicative of the object 430 exiting the occluded sensor zone 402, the vehicle computing system 102 can determine that the occluded sensor zone 402 is unoccupied.

According to another aspect of the present disclosure, when the sensors 108 of the vehicle 104 receive at least one sensor signal from the occluded sensor zone 402, the vehicle computing system 102 can determine that the occluded sensor zone 402 is occupied. As another example, alternatively or additionally to the preceding example, if the vehicle 104 tracks the object 430 as it enters the occluded sensor zone 402, and subsequently tracks the object 430 as it exits the occluded sensor zone for two, then the vehicle 104 can determine that the occluded sensor for two is unoccupied. Alternatively, if the vehicle 104 is unable to track the object 430 after the object 430 enters the occluded sensor zone 402, and the vehicle 104 does not detect any sensor signals from the occluded sensor zone 402, then the vehicle 104 can determine that the occluded sensor zone 402 is occupied for a predetermined amount of time after which the vehicle 104 can determine that the occluded sensor zone 402 is unoccupied. As yet another example, if the vehicle 104 tracks the object 430 leaving the occluded sensor zone 402, and the vehicle 104 does not detect any sensor signals from the occluded sensor zone 402, then the vehicle 104 can determine that the occluded sensor zone 402 is unoccupied, or will be unoccupied after a predetermined amount of time.

Figure 5A:
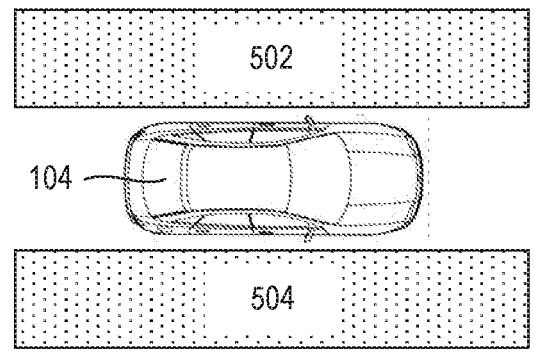
FIGS. 5A-5C depict an example autonomous vehicle, according to example embodiments of the present disclosure.
Figure 5B:
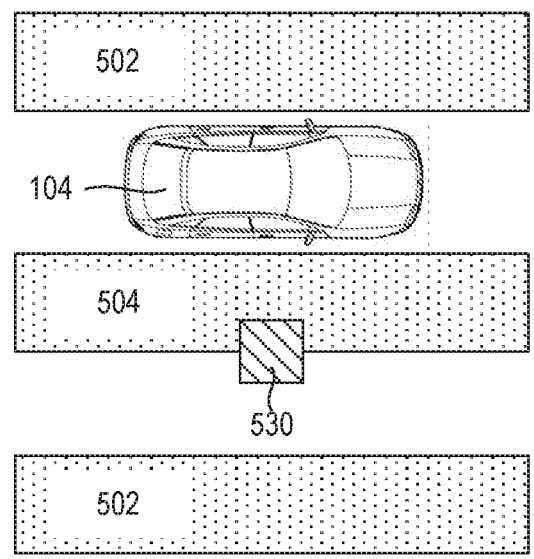
Figure 5C:
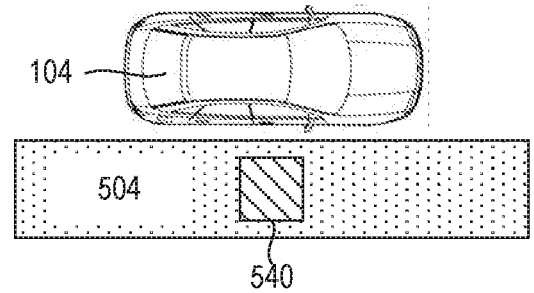

As shown in FIGS. 5A the vehicle 104 can include occluded senor zones 502 and 504. In FIG. 5B, the surrounding environment of the vehicle 104 can include the object 530 that is partly in the occluded sensor zone 504. The vehicle computing system 102 can obtain sensor data 109 indicative of the object 530 that is partly in the occluded sensor zone 504. In FIG. 5C, the surrounding environment of the vehicle 104 can include the object 540 that is completely inside the occluded sensor zone 504. The vehicle computing system 102 can obtain sensor data 109 indicative of the object 540 that is completely in the occluded sensor zone 504.

According to an aspect of the present disclosure, when the vehicle computing system 102 obtains sensor data 109 indicative of the object 530, the vehicle computing system 102 can determine that the occluded sensor zone 504 is occupied.

According to an aspect of the present disclosure, when the sensors 108 receive at least one sensor signal from the occluded sensor zone 504, the vehicle computing system 102 can determine that the occluded sensor zone 504 is occupied. The at least one sensor signal from the occluded sensor zone 504 may or may not correspond to the object 540.

The occluded sensor zones illustrated in FIGS. 3A-D, 4A-D, and 5A-C are provided as examples only. In various instances, occluded sensor zones can have many other locations, shapes, and/or other characteristics that are different from the example zones illustrated in FIGS. 3A-5C.

Figure 6:
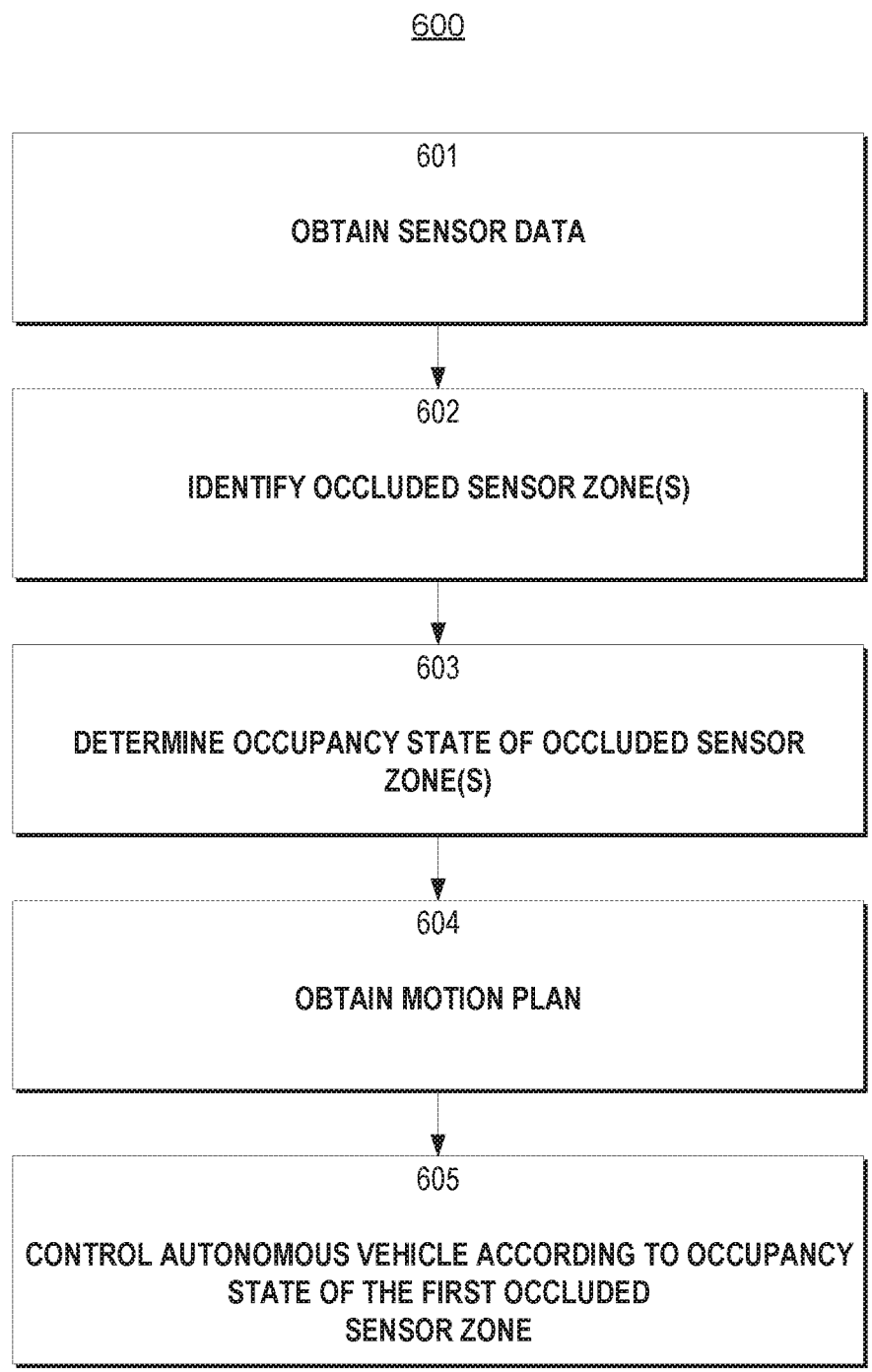
FIG. 6 depicts a flow diagram of controlling an autonomous vehicle according to example embodiments of the present disclosure.

FIG. 6 depicts flow diagrams of example method(s) for controlling an autonomous vehicle according to example embodiments of the present disclosure. One or more portion(s) of the method 600 can be implemented as operations by one or more computing system(s) such as, for example, the computing system(s) 102, 120, 701, and 710 shown in FIGS. 1, 2, and 7. Moreover, one or more portion(s) of the method 600 can be implemented as an algorithm on the hardware components of the system(s) described herein (e.g., as in FIGS. 1, 2, and 7) to, for example, determine an occupancy state of an occluded sensor zone. FIG. 6 depicts elements performed in a particular order for purposes of illustration and discussion. Those of ordinary skill in the art, using the disclosures provided herein, will understand that the elements of any of the methods (e.g., of FIG. 6) discussed herein can be adapted, rearranged, expanded, omitted, combined, and/or modified in various ways without deviating from the scope of the present disclosure.

At (601), the method 600 can include obtaining sensor data. For example, the vehicle computing system 102 can obtain sensor data 109 from sensors 108 onboard the vehicle 104. The sensor data 109 can be indicative of a surrounding environment of the vehicle 104. The surrounding environment can include one or more occluded sensor zone(s). The sensor data 109 can include raw sensor data descriptive of one or more sensor signal(s) received from the surrounding environment.

At (602), the method 600 can include identifying occluded sensor zones. For example, the vehicle computing system 102 can identify one or more occluded sensor zone(s) such that each of the one or more occluded sensor zone(s) comprise a region of the surrounding environment from which an amount of raw sensor data obtained by the vehicle computing system 102 is below a minimum threshold. As another example, the vehicle computing system 102 can identify one or more occluded sensor zone(s) such that each of the one or more occluded sensor zone(s) comprise a region of the surrounding environment for which the sensors 108 of the vehicle 104 are occluded by one or more physical dimension(s) of the vehicle 104. In some implementations, the sensors 108 of the vehicle 104 can comprise a LIDAR sensor mounted on a roof of the vehicle 104. Each of the one or more occluded sensor zone(s) can comprise a region of the surrounding environment proximate to a side of the vehicle 104 for which the LIDAR sensor is occluded by portions of the roof of the vehicle 104. The vehicle computing system 102 can store data representing the one or more occluded sensor zone(s) in the occluded sensor zone data 270.

At (603), the method 600 can include determining an occupancy state of occluded sensor zones. For example, the vehicle computing system 102 can determine that a first occluded sensor zone of the one or more occluded sensor zone(s) is occupied based at least in part on the sensor data 109. The vehicle computing system 102 can determine that the first occluded sensor zone is occupied by filtering the sensor data 109 to determine above-ground sensor data, and determine that the first occluded sensor zone is occupied based at least in part on the above-ground sensor data. As another example, the vehicle computing system 102 can detect at least one sensor signal from the first occluded sensor zone, and determined that the first occluded sensor zone is occupied based at least in part on the at least one sensor signal. The vehicle computing system 102 can store data representing the occupancy state of each of the occluded sensor zones in the occupancy state data to 272.

At (604), the method 600 can include obtaining a motion plan. For example, the vehicle computing system 102 can perform various processing techniques on the sensor data 109, and generate an appropriate motion plan through the vehicle 104's surrounding environment. The vehicle computing system 102 can store data representing the motion plan in the motion plan data 264.

At (605), the method 600 can include controlling an autonomous vehicle according to the occupancy state of the first occluded sensor zone. For example, the vehicle computing system 102 can obtain the motion plan of the vehicle 104 through the surrounding environment, and determine that the motion plan intercepts the first occluded sensor zone. The vehicle computing system 102 can determine that the motion plan intercepts the first occluded sensor zone by determining a trajectory of the vehicle 104 from the motion plan, and determining that the trajectory intersects the first occluded sensor zone. The vehicle computing system 102 can determine that the trajectory intercepts the first occluded sensor zone when the trajectory requires the vehicle 104 to travel through a region of the surrounding environment that corresponds to the first occluded sensors of As another example, if the first occluded sensor zone is to the immediate left of the vehicle 104, and a trajectory requires the vehicle 104 to switch into its left lane, then the vehicle computing system 102 can determine that the trajectory intersects the first occluded sensor zone. As yet another example, if the first occluded sensor zone is to the immediate right of the vehicle 104, and a trajectory requires the vehicle 104 to make a right turn, then the vehicle computing system 102 can determine that the trajectory intersects the first occluded sensor zone. The vehicle computing system 102, in response to determining that the motion plan intercepts the first occluded sensor zone, can preclude the vehicle 104 from executing the motion plan.

In some implementations, the vehicle computing system 102 can determine the motion plan at (604) based on the occluded sensor zone data 270 and/or the occupancy state data 272. For example, the vehicle computing system 102 can determine the motion plan such that the vehicle 104 will travel clear of one or more occluded sensor zone(s) stored in the occluded sensor zone data 274 for which an occupancy state stored in the occupancy state data 272 is occupied. As another example, the vehicle computing system 102 can determine the motion plan by optimizing a set of cost functions where one of the cost functions provides a cost (e.g., a relatively large cost) for entering an occupied occluded sensor zone. Accordingly, the vehicle computing system 102 can determine that a motion plan that intercepts the occupied occluded sensor zone is not cost effective, and the vehicle computing system 102 can determine an alternate motion plan that does not intercept the occupied occluded sensor zone.

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 102 of the vehicle 104 and, in some implementations, remote computing system(s) 710 including one or more remote computing system(s) that are remote from the vehicle 104 (e.g., the operations computing system 120) that can be communicatively coupled to one another over one or more networks 720. The remote computing system(s) 710 can be associated with a central operations system and/or an entity associated with the vehicle 104 such as, for example, a vehicle owner, vehicle manager, fleet operator, service provider, etc.

The computing device(s) 701 of the vehicle computing system 102 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle 104 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 104 can store instructions 706 that when executed by the one or more processors 702 on-board the vehicle 104 cause the one or more processors 702 (the vehicle computing system 102) to perform operations such as any of the operations and functions of the vehicle computing system 102, as described herein, one or more operations of method 600, and/or any other operations and functions of the vehicle computing system 102, as described herein.

The memory 704 can store data 708 that can be obtained, received, accessed, written, manipulated, created, and/or stored. The data 708 can include, for instance, data associated with perception, prediction, motion plan, maps, occluded sensor zone(s), occupancy states, and/or other data/information as described herein. In some implementations, the computing device(s) 701 can obtain data from one or more memory device(s) that are remote from the vehicle 104.

The computing device(s) 701 can also include a communication interface 703 used to communicate with one or more other system(s) on-board the vehicle 104 and/or a remote computing device that is remote from the vehicle 104 (e.g., of remote computing system(s) 710). The communication interface 703 can include any circuits, components, software, etc. for communicating via one or more networks (e.g., 720). In some implementations, the communication interface 703 can include, for example, one or more of a communications controller, receiver, transceiver, transmitter, port, conductors, software, and/or hardware for communicating data.

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system(s) 710 can include one or more remote computing device(s) that are remote from the vehicle computing system 102. The remote computing device(s) can include components (e.g., processor(s), memory, instructions, data) similar to that described herein for the computing device(s) 701. Moreover, the remote computing system(s) 710 can be configured to perform one or more operations of the operations computing system 120, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling an autonomous vehicle, the method comprising:
    obtaining sensor data indicative of a surrounding environment of the autonomous vehicle, the sensor data descriptive of a plurality of sensor signals for the surrounding environment captured by a sensor, wherein the sensor is located on the autonomous vehicle, wherein the surrounding environment comprises a plurality of regions, and wherein a subset of the plurality of sensor signals describes a particular region of the plurality of regions of the surrounding environment;
    determining that the particular region is occupied by an object based on the subset of the plurality of sensor signals;
    determining that the particular region is an occluded sensor zone by determining that a quantity of sensor signals in the subset of sensor signals does not satisfy a threshold for object identification, wherein the threshold is indicative of a particular amount of sensor data for identifying the object; and
    in response to determining that the occluded sensor zone is occupied, controlling the autonomous vehicle to travel clear of the occluded sensor zone.

2. The computer-implemented method of claim 1, wherein the particular region is occluded by physical dimensions of the autonomous vehicle.

3. The computer-implemented method of claim 2, wherein the sensor comprises a light detection and ranging sensor mounted on a roof of the autonomous vehicle, and wherein the particular region is proximate to a side of the autonomous vehicle for which the light detection and ranging sensor is occluded by portions of the roof of the autonomous vehicle.

4. The computer-implemented method of claim 1, wherein controlling the autonomous vehicle to travel clear of the occluded sensor zone comprises:
   obtaining a motion plan of the autonomous vehicle through the surrounding environment;
   determining that the motion plan intersects the particular region; and
   in response to determining that the motion plan intersects the particular region, precluding the autonomous vehicle from executing the motion plan.

5. The computer-implemented method of claim 1, wherein controlling the autonomous vehicle to travel clear of the occluded sensor zone comprises:
   obtaining a motion plan that includes a lane change; and
   in response to determining that the occluded sensor zone is occupied, precluding the autonomous vehicle from executing the lane change.

6. The computer-implemented method of claim 1, wherein the sensor comprises at least one of: a light detection and ranging system, a radio detection and ranging system, a camera, or a motion sensor.

7. The computer-implemented method of claim 1, further comprising:
   in response to determining that the occluded sensor zone is occupied based on the subset of sensor signals, assigning an occupied occupancy state to the occluded sensor zone for a predetermined amount of time.

8. The computer-implemented method of claim 7, further comprising:
   obtaining second sensor data after the predetermined amount of time; and
   assigning an unoccupied occupancy state to the occluded sensor zone in response to a determination that the second sensor data does not comprise a sensor signal for the occluded sensor zone.

9. A computing system for controlling an autonomous vehicle, the computing system comprising:
   one or more processors; and
   one or more tangible, non-transitory, computer readable media that store instructions that are executable by the one or more processors to cause the computing system to perform operations, the operations comprising:
      obtaining sensor data indicative of a surrounding environment of the autonomous vehicle, the sensor data descriptive of a plurality of sensor signals for the surrounding environment captured by a sensor located on the autonomous vehicle, wherein the surrounding environment comprises a plurality of regions, and wherein a subset of the plurality of sensor signals describes a particular region of the plurality of regions of the surrounding environment;
      determining that the particular region is occupied by an object based on the subset of the plurality of sensor signals;
      determining that the particular region is an occluded sensor zone by determining that a quantity of sensor signals in the subset of sensor signals does not satisfy a threshold for object identification, wherein the threshold is indicative of a particular amount of sensor data for identifying the object; and
      determining that the occluded sensor zone is occupied based on the subset of sensor signals that describe the particular region; and
      in response to determining that the occluded sensor zone is occupied, controlling the autonomous vehicle to travel clear of the occluded sensor zone.

10. The computing system of claim 9, wherein the sensor comprises a light detection and ranging sensor mounted on a roof of the autonomous vehicle, and wherein the particular region of the surrounding environment is proximate to a side of the autonomous vehicle for which the light detection and ranging sensor is occluded by portions of the roof of the autonomous vehicle.

11. The computing system of claim 9, wherein controlling the autonomous vehicle to travel clear of the occluded sensor zone comprises:
   obtaining a motion plan of the autonomous vehicle through the surrounding environment;
   determining that the motion plan intersects the particular region; and
   in response to determining that the motion plan intersects the particular region, precluding the autonomous vehicle from executing the motion plan.

12. The computing system of claim 9, wherein controlling the autonomous vehicle to travel clear of the occluded sensor zone comprises:
   obtaining a motion plan that includes a lane change; and
   in response to determining that the occluded sensor zone is occupied, precluding the autonomous vehicle from executing the lane change.

13. The computing system of claim 9, wherein the sensor comprises at least one of: a light detection and ranging system, a radio detection and ranging system, a camera, or a motion sensor.

14. An autonomous vehicle, comprising:
   one or more processors; and
   one or more tangible, non-transitory, computer readable media that store instructions that are executable by the one or more processors to cause the one or more processors to perform operations, the operations comprising:
      obtaining sensor data indicative of a surrounding environment of the autonomous vehicle, the sensor data descriptive of a plurality of sensor signals for the surrounding environment captured by a sensor located on the autonomous vehicle, wherein the surrounding environment comprises a plurality of regions, and wherein a subset of the plurality of sensor signals describes a particular region of the plurality of regions of the surrounding environment;
      determining that the particular region is occupied by an object based on the subset of the plurality of sensor signals;
      determining that the particular region is an occluded sensor zone by determining that a quantity of sensor signals in the subset of sensor signals does not satisfy a threshold for object identification, wherein the threshold is indicative of a particular amount of sensor data for identifying the object; and
      in response to determining that the occluded sensor zone is occupied, controlling the autonomous vehicle to travel clear of the occluded sensor zone.

15. The autonomous vehicle of claim 14, wherein controlling the autonomous vehicle to travel clear of the occluded sensor zone comprises:
   obtaining a motion plan of the autonomous vehicle through the surrounding environment;
   determining that the motion plan intersects the particular region corresponding to the occluded sensor zone; and in response to determining that the motion plan intersects the particular region corresponding to the occluded sensor zone, precluding the autonomous vehicle from executing the motion plan.

16. The autonomous vehicle of claim 14, wherein controlling the autonomous vehicle to travel clear of the occluded sensor zone comprises:

obtaining a motion plan that includes a lane change; and in response to determining that the occluded sensor zone is occupied, precluding the autonomous vehicle from executing the lane change.

17. The autonomous vehicle of claim 14, wherein the sensor comprises at least one of: a light detection and ranging system, a radio detection and ranging system, a camera, or a motion sensor.

* * * * *